(12) United States Patent
Delmarco et al.

(10) Patent No.: US 10,661,823 B2
(45) Date of Patent: May 26, 2020

(54) FEEDBACK ACTUATOR FOR A STEER-BY-WIRE STEERING MECHANISM

(71) Applicants: THYSSENKRUPP PRESTA AG, Eschen (LI); thyssenkrupp AG, Essen (DE)

(72) Inventors: Claudio Delmarco, Feldkirch (AT); Felix Brandl, Dornbirn (AT); Claudio Virzi, Rorschach (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 158 days.

(21) Appl. No.: 15/772,617

(22) PCT Filed: Nov. 17, 2016

(86) PCT No.: PCT/EP2016/077977
§ 371 (c)(1),
(2) Date: May 1, 2018

(87) PCT Pub. No.: WO2017/089218
PCT Pub. Date: Jun. 1, 2017

(65) Prior Publication Data
US 2019/0118853 A1    Apr. 25, 2019

(30) Foreign Application Priority Data

Nov. 25, 2015    (DE) ........................ 10 2015 015 147

(51) Int. Cl.
*B62D 5/00*      (2006.01)
(52) U.S. Cl.
CPC ............. *B62D 5/006* (2013.01); *B62D 5/005* (2013.01)

(58) Field of Classification Search
CPC ................................ B62D 5/005; B62D 5/006
(Continued)

(56) References Cited

U.S. PATENT DOCUMENTS

| | | | |
|---|---|---|---|
| 2002/0005315 A1* | 1/2002 | Kind ...................... | B62D 5/005 180/444 |
| 2011/0184608 A1 | 7/2011 | Benyo | |

(Continued)

FOREIGN PATENT DOCUMENTS

| | | |
|---|---|---|
| CN | 101860305 A | 10/2010 |
| CN | 203876812 U | 10/2014 |

(Continued)

OTHER PUBLICATIONS

English Translation of International Search Report issued in PCT/EP2016/077977, dated Mar. 8, 2017 (dated Mar. 20, 2017).

*Primary Examiner* — Tony H Winner
*Assistant Examiner* — Felicia L. Brittman
(74) *Attorney, Agent, or Firm* — thyssenkrupp North America, LLC

(57) ABSTRACT

A feedback actuator for a motor vehicle may include a steering adjuster that acts on steered wheels of the motor vehicle and is controlled electronically based on steering commands from a driver of the motor vehicle. The feedback actuator may transmit feedback from a road on which the motor vehicle is traveling to a steering wheel via a steering shaft. Further, the feedback actuator may have a preloaded crank drive and an electric motor configured as torque-generating means. The feedback actuator may produce a torque to simulate the feedback of the road, and the torque may be formed by a sum of a torque from the preloaded crank drive applied to the steering shaft and a torque from the electric motor applied onto the steering shaft.

10 Claims, 3 Drawing Sheets

(58) Field of Classification Search
USPC .......................................................... 180/402
See application file for complete search history.

(56) References Cited

U.S. PATENT DOCUMENTS

| | | |
|---|---|---|
| 2011/0224876 A1 | 9/2011 | Paholics |
| 2012/0041645 A1 | 2/2012 | Benyo |
| 2013/0030653 A1 | 1/2013 | Soos |

FOREIGN PATENT DOCUMENTS

| | | |
|---|---|---|
| DE | 19539101 C | 2/1997 |
| DE | 10248343 A | 8/2003 |
| DE | 11 2006 001 724 T | 5/2008 |
| FR | 2887840 A | 1/2007 |
| FR | 2911105 A | 7/2008 |
| JP | 2003200843 A | 7/2003 |
| JP | 2004314735 A * | 11/2004 |
| JP | 2004314735 A | 11/2004 |
| JP | 2004314736 A | 11/2004 |
| JP | 2009 035149 A | 2/2009 |
| KR | 20120061478 A | 6/2012 |
| WO | 2008/099104 A | 8/2008 |

\* cited by examiner

FEEDBACK ACTUATOR FOR A STEER-BY-WIRE STEERING MECHANISM

CROSS REFERENCE TO RELATED APPLICATIONS

This application is a U.S. National Stage Entry of International Patent Application Serial Number PCT/EP2016/077977, filed Nov. 17, 2016, which claims priority to German Patent Application No. DE 10 2015 015 147.9, filed Nov. 25, 2015, the entire contents of both of which are incorporated herein by reference.

FIELD

The present disclosure generally relates to steering mechanisms, including feedback actuators and steer-by-wire steering systems in motor vehicles.

BACKGROUND

In the case of steer-by-wire steering systems, the position of the steered wheels is not directly coupled with the steering wheel. There is a connection between the steering wheel and the steered wheels via electrical signals. The driver's steering command is taken up by a steering angle sensor and, depending on the driver's steering command, the position of the steered wheels is regulated via a steering adjuster. A mechanical connection to the wheels is not provided so that after actuation of the steering wheel, force feedback is missing, for example, a relevant response when parking, where a small force is desired for comfort reasons, or during a usual drive, where a higher steering torque corresponding to the vehicle response is desired. To simulate the feedback of the road on the steering wheel with steer-by-wire steering, it is necessary to provide a feedback actuator on the steering wheel and the steering column, which characterizes a steering feel according to the feedback effects of the steering wheel. This feedback actuator generally consists of an electric motor, which acts on the steering column via a reduction gear. In the case of these steering wheel actuators, it is disadvantageous that their production is associated with high costs and there is a substantial space requirement in the area of the steering column.

DE 195 39 101 C1 discloses a reaction simulation where a restoring torque is exerted on the steering wheel and the steering shaft. Thereby, a return spring arrangement is provided, which exerts a restoring torque on the steering wheel. The desired course of the restoring torque as a function of the steering angle is generated by an electric motor. A disadvantage of this solution is that the motor must be designed with large-scale dimensions accordingly due to the required high level of restoring torques.

Thus a need exists for an improved feedback actuator for a steering mechanism for motor vehicles.

DETAILED DESCRIPTION

Figure 1:
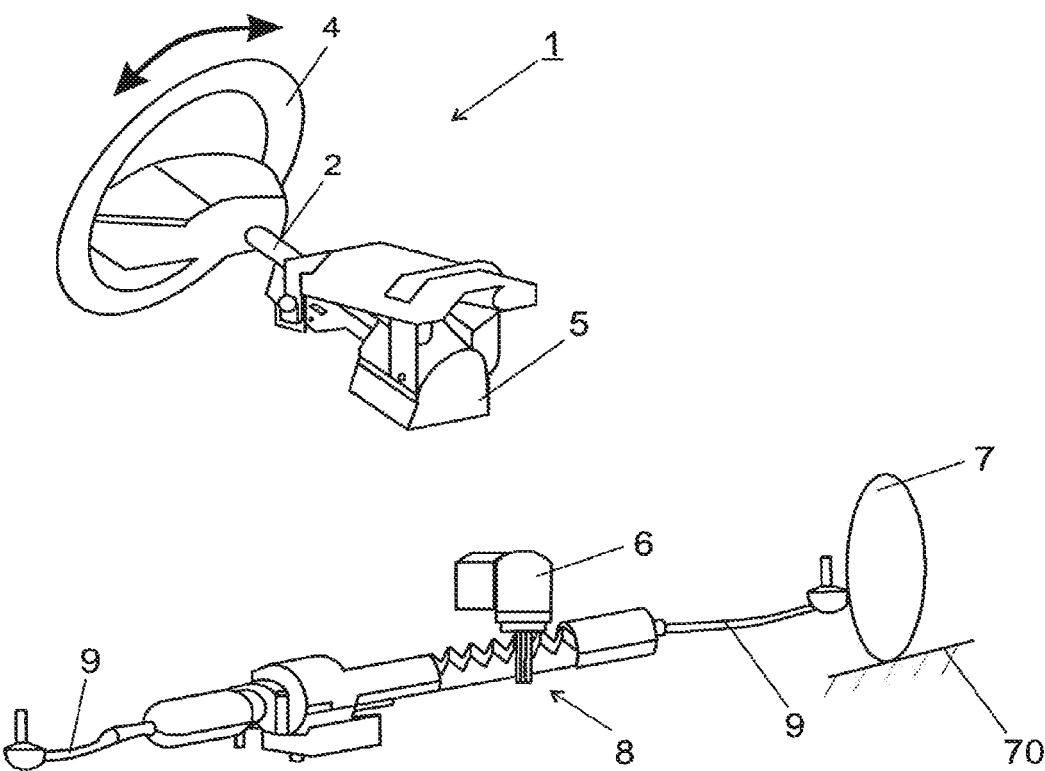
FIG. 1 is a schematic view of an example steer-by-wire vehicle steering mechanism.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

A feedback actuator for a steering mechanism for motor vehicles equipped with a steering adjuster may act on the steered wheels and may be controlled electronically in accordance with the driver's steering command. The the feedback actuator may transmit the feedback from the road to a steering wheel via a steering shaft. The feedback actuator may have a preloaded crank drive and an electric motor as a torque-generating means. Due to the preloaded crank drive, the electric motor can be much smaller. This saves installation space, weight and costs.

It is advantageous if the feedback actuator according to the invention is used in a steer-by-wire steering system. Furthermore, it is conceivable and possible, to use such a feedback actuator in classic steering systems, such as in an electromechanical power steering mechanism. Preferably, the torque formed by the feedback actuator is formed to simulate the feedback of the road as a sum of a torque from the preloaded crank drive applied onto the steering shaft and a torque from the electric motor applied onto the steering shaft.

It is advantageous if the preloaded crank drive has a crankshaft connected to the steering shaft in a torque-proof manner by means of a reduction gear. Preferably, the crank drive has a toggle-lever linkage with at least one pressure piece acting on a spring element.

Preferably, the toggle-lever linkage is furthermore symmetrical, in particular, axisymmetric, to the crankshaft with at least two pin joints, wherein a pressure piece acting on a spring element is arranged on the end, which is spaced away from the crankshaft, of each lever arm.

In a preferred embodiment, a total of two lever arms are provided and the spring element is formed by a disk spring column. The crank drive is preferably designed in such a way that both pin joints are identically bent in a neutral position of the steering shaft and the crank drive. This has the advantage that the torque introduced onto the steering shaft by the crank drive is the same in both steering directions. Favorably, the arrangement of the bent pin joints at an identical angle to the crankshaft can be understood as identically bent pin joints. Thereby, the lever arms are connected to each other in such a way that, when rotating the steering shaft, the one pin joint is preferably bent and the other pin joint is preferably unbent.

When rotating the steering shaft, a degressively increasing counter-torque generated by the preloaded crank drive can be adjusted by the electric motor acting on the steering shaft. Thereby, it is advantageous if the adjustment takes place depending on the motor vehicle's speed.

When rotating the steering shaft, preferably, a degressively increasing counter-torque generated by the crank drive can be adjusted by the electric motor acting on the steering shaft. Thereby, the adjustment preferably occurs depending on the speed of the motor vehicle and the steering speed.

Furthermore, a steer-by-wire steering system for a feedback actuator is provided, which applies a force simulating a coupling between the steering wheel and a steering gear onto a steering wheel of the steering system connected to a steering shaft, wherein the feedback actuator has a preloaded crank drive and electric motor as a torque-generating means.

In FIG. 1, a steer-by-wire steering mechanism 1 is shown. A rotation-angle sensor (not shown) is attached to a steering shaft 2, which detects the manual torque applied by rotating the steering wheel 4. Furthermore, a feedback actuator 5 is attached to the steering shaft 2, which is used to transmit the feedback effects of the road to the steering wheel 4 and thereby, to give the driver a feedback on the steering and driving behavior of the vehicle. The driver's steering command is transmitted to a control unit via signal lines via the angle of rotation of the steering shaft 2 measured by the rotation-angle sensor. The control unit controls an electric steering adjuster 6, which controls the position of the steered wheels 7, depending on the signal from the rotation-angle sensor, as well as other parameters, such as motor vehicle speed, yaw rate and the like. The steering adjuster 6 indirectly acts on the steered wheels 7 via a steering gear 8 as well as a tie rod 9 and other components.

Figure 2:
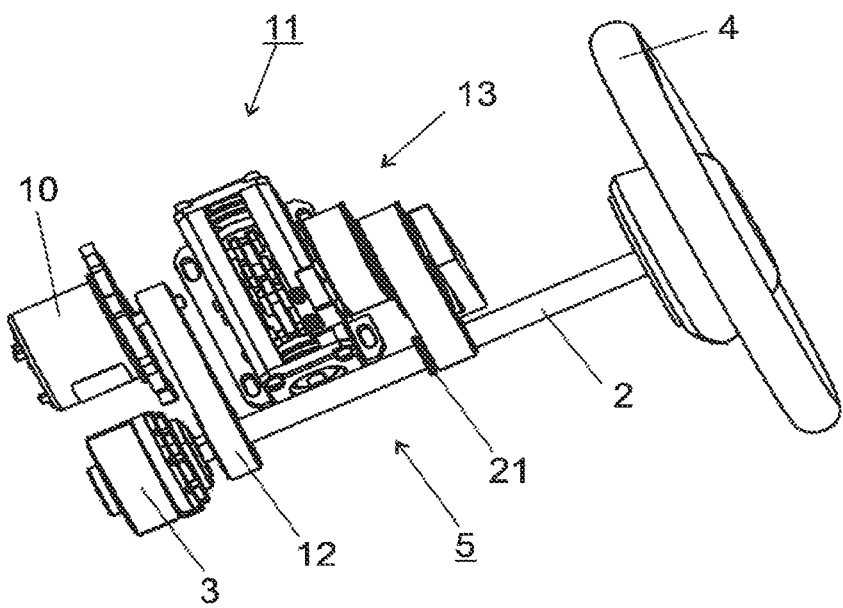
FIG. 2 is a spatial view of an example steering wheel with a steering shaft, a friction element, electric motor, and a feedback actuator.

FIG. 2 shows a feedback actuator 5 according to the invention with an electric motor 10 and a crank drive 11. The steering wheel 4 is connected to the steering shaft 2 in a torque-proof manner. There is an adjustable friction and damping element 3 arranged at the end of the steering shaft 2, which superimposes the applied manual torque depending on the motor vehicle and steering angle speed and the steering direction in order to give the driver the most natural steering feel possible. The electric motor 10 is connected to the steering shaft 2 via a belt drive 12. The crank drive 11 has a crankshaft 14 connected to the steering shaft 2 by means of a timing-belt gear 13.

Figure 3:
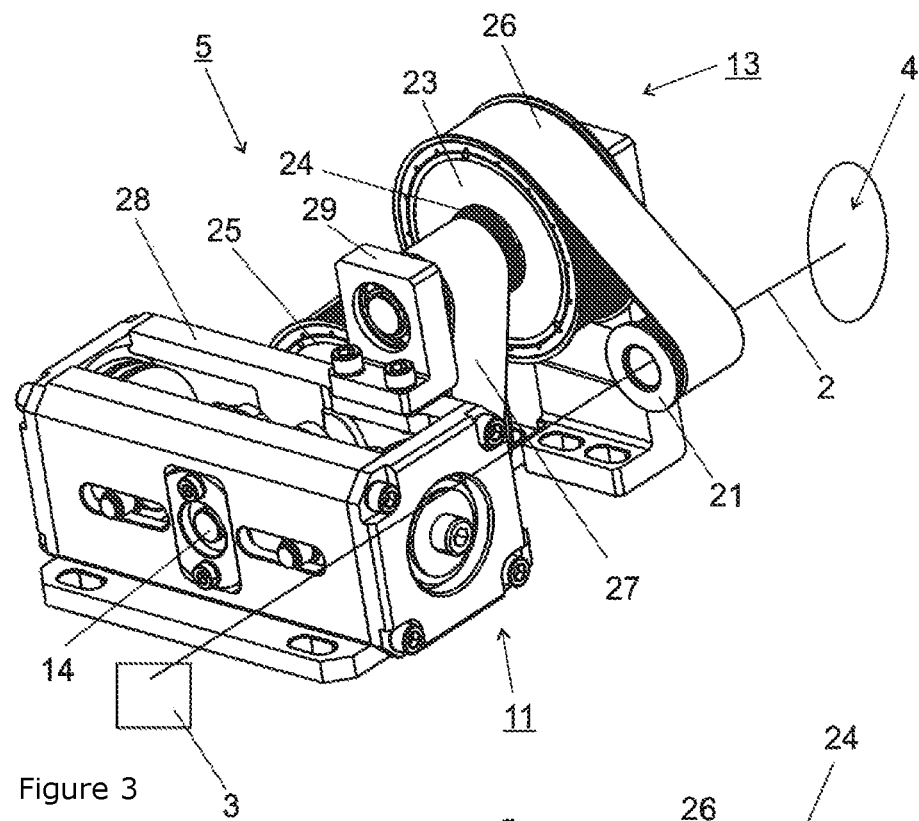
FIG. 3 is an enlarged spatial view of an example crank drive of a feedback actuator.
Figure 4:
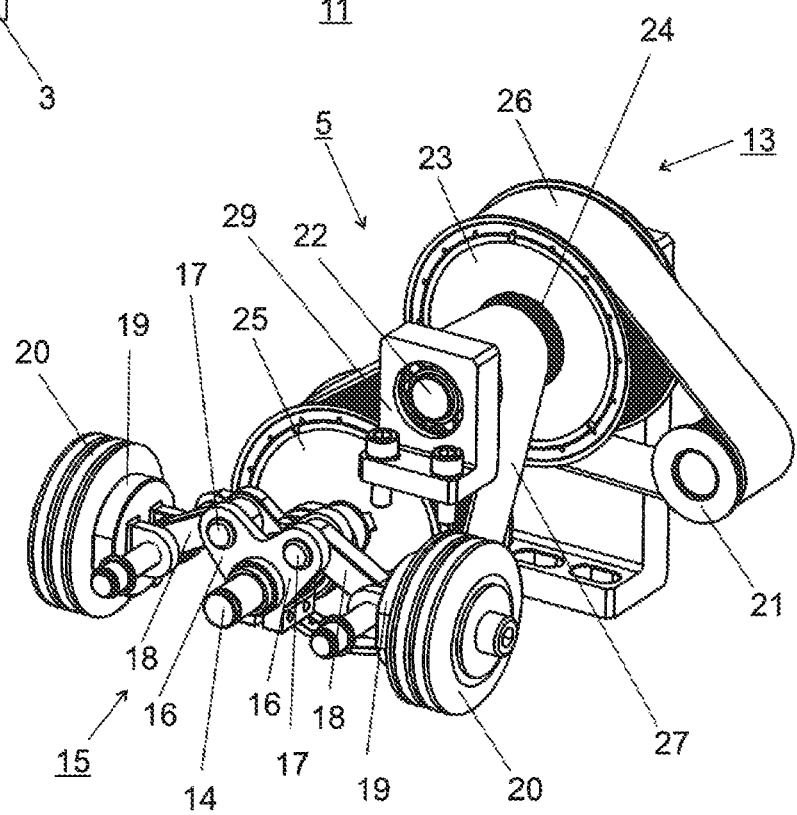
FIG. 4 is an enlarged spatial view of the example crank drive of FIG. 3 in a neutral position.
Figure 5:
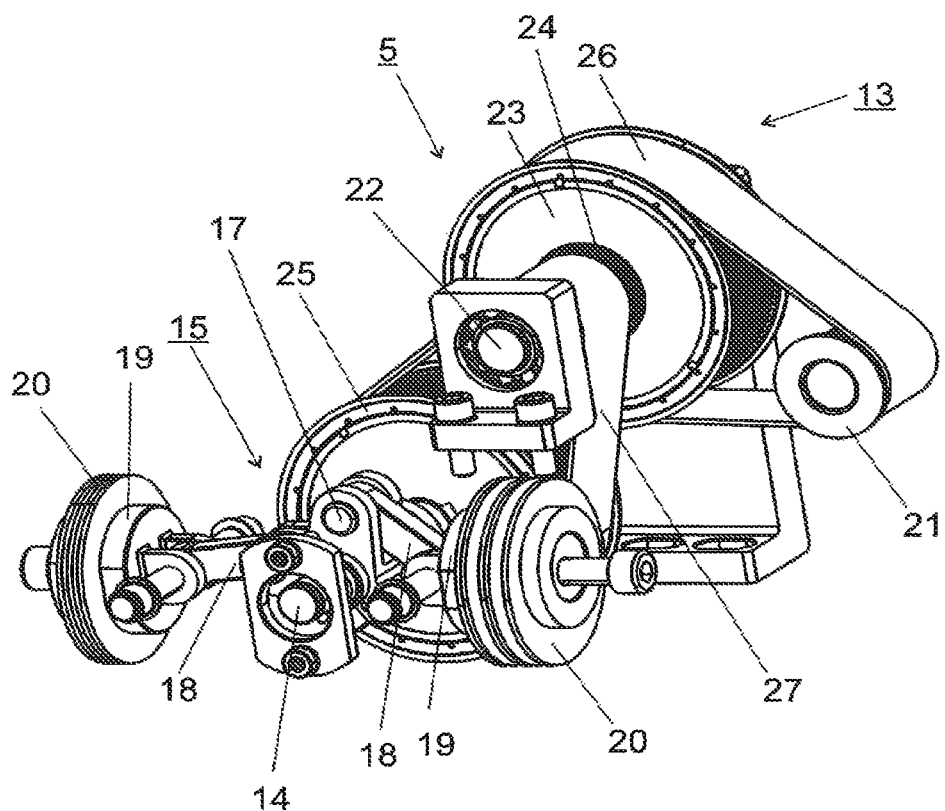
FIG. 5 is an enlarged spatial view of the example crank drive of FIG. 3 in a turned-in position of the steering wheel.

In FIGS. 3, 4 and 5, the crank drive 11 is shown in detail. FIG. 4 shows the straight position of the steering mechanism, the so-called zero position. On the contrary, in FIG. 5, the steering wheel 4 is steered out and the wheels 7 are turned in.

A toggle-lever linkage 15 is connected to the crankshaft 14 in a torque-proof manner, said linkage having two lever arms 16, which each have a pin joint 17 and are connected to a pressure piece 19 swivel-mounted on it at its end 18 spaced away from its crankshaft. The pressure pieces 19 respectively act on a disk spring column 20 perpendicularly. The toggle-lever linkage 15 is symmetrical to the crankshaft axis and arranged in a housing 28. The pressure pieces 19 and the disk springs 20 are perpendicular to the crankshaft axis at one level. The ends of the lever arms 16, swivel-mounted on the crankshaft 14, are permanently connected to each other. The timing-belt drive 13 has a belt pulley 21 permanently connected to the steering shaft 2, an intermediate shaft 22 with two belt pulleys 23, 24 connected in a torque-proof manner, as well as a belt pulley 25 permanently connected to the crankshaft 14, and two timing belts 26, 27.

The sizes of the belt pulleys 21, 23, 24, 25 are chosen so that the timing-belt drive 13 has a desired reduction. A fastener 29 for the housing 28, in which the toggle-lever linkage 15 is arranged, links to the intermediate shaft 22.

Figure 6:
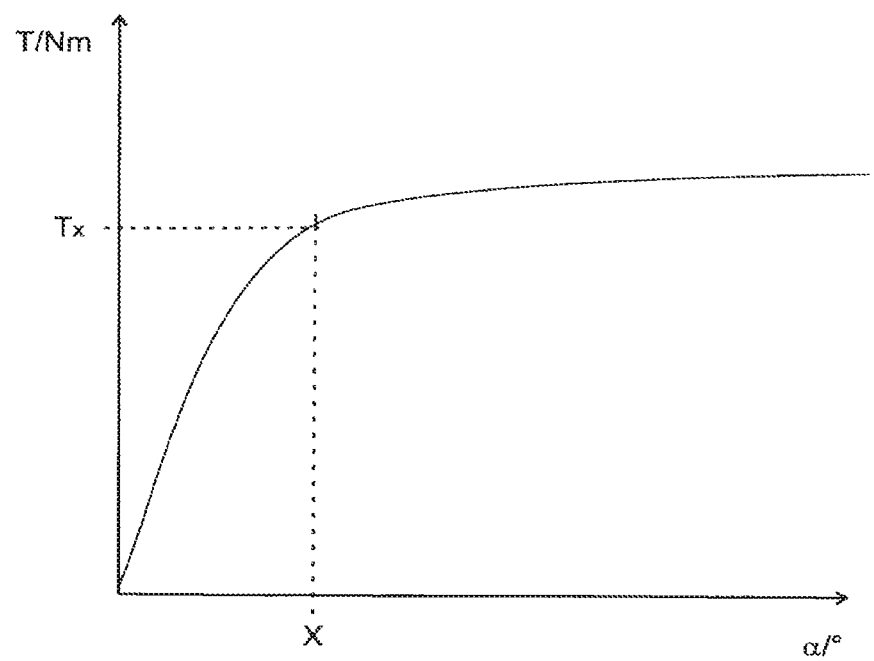
FIG. 6 is a graph of a steering torque curve of an example crank drive.

In order to transmit an ever increasing resistance or steering torque to the driver up to a certain steering angle (e.g. 120°), an angle of rotation introduced by the driver via the steering wheel 4 to the steering shaft 2 is passed on and then it is passed on to the crank drive 11 via the timing-belt drive 13. Thereby, depending on the direction of rotation, the one pin joint 17 is unbent and the other pin joint 17 is bent so that the pressure piece 19 fastened to the unbent pin joint 17 is moved in the direction of the disk spring column 20 and this presses against the housing 28. The disk spring column 20, consisting of a plurality of disk springs, generates a degressively increasing counter-force when pressed together, which is transmitted to the shaft 14 during crank operation via the crank lever 18, 16 and results in an angle-dependent torque, which is proportional to the length of the crank lever arm. The lift movement in the direction of the axis of the disk spring column has a sinusoidal progression (angle and path dependency); this superimposed with the degressive characteristic curve of the disk springs results in a typical torque characteristic curve, which simulates an appealing driving feel. An example of a degressive steering wheel torque curve or manual torque curve of the crank drive 11 of T over $\alpha$ is shown in FIG. 6. The curve initially steeply increases up to a steering wheel angle X up to the manual torque Tx and then reaches approximately a saturation.

Due to the electric motor 10, which is coupled with the steering shaft 2, the manual torque curve generated by the disk springs 20 can be increased or decreased depending on the speed at hand. This torque is increased or decreased depending on the cornering force transmitted by the road to the roadsides. The electric motor 10 can grip onto the steering shaft 2 or the crankshaft 14.

The feedback actuator according to the invention generates a manual torque curve for the driving and parking operations of a motor vehicle. In order to reach a strongly increasing and degressive torque curve, the principle of a crank drive and a toggle lever are used. In addition, a disk spring column is used to generate force. A torque is therefore built up on the crankshaft by the tangential force, which additionally results in a degressive course of the torque curve with the characteristics of the disk springs.

The speed-dependent adjustment of the manual torque curve is carried out by the electric motor, which engages in the steering axle with appropriate transmission. By means of the mechanical components, the electric motor can be designed to be clearly smaller, which saves costs and weight. The base friction in the system and the manual torque curve for parking operations are represented via an adjustable friction element in the steering train.

What is claimed is:

1. A feedback actuator for a steering mechanism for a motor vehicle, the feedback actuator comprising:
    a steering adjuster that acts on steered wheels and is controlled electronically based on steering commands of a driver of the motor vehicle;
    a steering shaft via which feedback from a road is transmitted to a steering wheel; and
    a preloaded crank drive and an electric motor configured as torque-generating means,
    wherein the preloaded crank drive includes a toggle-lever linkage with a pressure piece that acts on a spring element, and wherein the toggle-lever linkage includes two lever arms and is symmetrical to a crankshaft of the preloaded crank drive with at least two pin joints,
wherein the pressure piece acting on the spring element is disposed on an end of each lever arm spaced apart from the crankshaft.

2. The feedback actuator of claim 1 wherein the feedback actuator produces a torque to simulate the feedback of the road, the torque being formed by a sum of a torque from the preloaded crank drive applied to the steering shaft and a torque from the electric motor applied onto the steering shaft.

3. The feedback actuator of claim 1 wherein the preloaded crank drive includes a crankshaft that is connected to the steering shaft in a torque-proof manner by way of a reduction gear.

4. The feedback actuator of claim 1 wherein the toggle-lever linkage includes exactly two lever arms, wherein the spring element is formed by a disk spring column.

5. The feedback actuator of claim 1 wherein in a neutral position of the steering shaft and the preloaded crank drive, the at least two pin joints are bent in the same manner.

6. The feedback actuator of claim 1 wherein the two lever arms are connected to each other such that when rotating the steering shaft a first of the at least two pin joints is bent and a second of the at least two pin joints is not bent.

7. The feedback actuator of claim 1 wherein when rotating the steering shaft, a degressively increasing counter-torque generated by the preloaded crank drive is adjustable by the electric motor acting on the steering shaft.

8. The feedback actuator of claim 7 wherein the preloaded crank drive is adjustable based on a speed of the motor vehicle.

9. A feedback actuator for a steering mechanism for a motor vehicle, the feedback actuator comprising:
a steering adjuster that acts on steered wheels and is controlled electronically based on steering commands of a driver of the motor vehicle;
a steering shaft via which feedback from a road is transmitted to a steering wheel; and
a preloaded crank drive and an electric motor configured as torque-generating means;
wherein the feedback actuator produces a torque to simulate the feedback of the road, the torque being formed by a sum of a torque from the preloaded crank drive applied to the steering shaft and a torque from the electric motor applied onto the steering shaft.

10. A feedback actuator for a steering mechanism for a motor vehicle, the feedback actuator comprising:
a steering adjuster that acts on steered wheels and is controlled electronically based on steering commands of a driver of the motor vehicle;
a steering shaft via which feedback from a road is transmitted to a steering wheel; and
a preloaded crank drive and an electric motor configured as torque-generating means;
wherein the preloaded crank drive includes a crankshaft that is connected to the steering shaft in a torque-proof manner by way of a reduction gear.

* * * * *